United States Patent [19]

Gleason

[11] 4,060,399
[45] Nov. 29, 1977

[54] SCRUBBER-COOLER TOWER

[76] Inventor: Thomas G. Gleason, 99 Colonial Parkway, Manhasset, N.Y. 11030

[21] Appl. No.: 718,600

[22] Filed: Aug. 30, 1976

[51] Int. Cl.² .............................................. B01D 47/02
[52] U.S. Cl. ...................................... 55/244; 55/355; 261/23 R; 261/126
[58] Field of Search .................. 55/226, 240, 244, 355; 261/23 R, 109, 110, 114 R, 126

[56] References Cited

U.S. PATENT DOCUMENTS

| | | | |
|---|---|---|---|
| 1,605,263 | 11/1926 | Millard | 261/114 R |
| 1,620,751 | 3/1927 | Bartlett | 261/114 R |
| 1,900,085 | 3/1933 | Wallis | 261/114 R |
| 2,398,345 | 4/1946 | Cooper | 261/114 R |
| 2,960,322 | 11/1960 | Eld | 261/114 R |
| 3,278,169 | 10/1966 | Mitchell | 261/114 R |
| 3,364,988 | 1/1968 | Hartmann | 261/114 R |

Primary Examiner—Frank W. Lutter
Assistant Examiner—David L. Lacey
Attorney, Agent, or Firm—Fidelman, Wolffe & Waldron

[57] ABSTRACT

The present invention relates to gas-liquid contact towers, and particularly to scrubbers such as those adapted to treating effluent dust laden gases such as off-gases from boilers, metallurgical furnaces and reactors before releasing such gases to the atmosphere.

5 Claims, 2 Drawing Figures

SCRUBBER-COOLER TOWER

BACKGROUND OF THE INVENTION

Gas-liquid contact towers are so widely used e.g., distilation, absorption, gas scrubbing, that they have become subject matter for a considerable number of practical and theoretical studies over the years. Large bodies of art exist to each aspect of tower structure and operation, and many efficient tower designs are available to one skilled in the art. Whole classes of tower types exist, e.g., packed towers, tray towers. In addition each class of towers is offered with numerous gas-liquid contact elements, e.g. target or impingement trays, sieve trays, valve trays. This invention is adapted principally to the class of gas-liquid contact towers which can be identified as tray towers and which briefly comprise vertical towers built with horizontal spaced apart trays. The liquid cascades from down tray to tray as the gas flows up through the trays, e.g. through bubble caps or perforations.

Although highly efficient gas-liquid towers are available to the art, their high efficiency depends very much upon existence of essentially constant steady state conditions with little variation in flow rates for gas and liquid. The tower operates efficiently at design capacity, relatively well at just above or below design capacity but woefully inefficiently when gas flow and/or liquid flow is far from the design flow rate e.g. at 25% of design. Difficulties caused by high turn down from design capacity are particularly severe in the instance of gas scrubbers, because high turn down is common and equipment often must be operated at partial capacity (certainly more often than in distillation columns, for example).

The art has, of course, appreciated existence of the turn down problem, and also that this problem can not be resolved to any substantial degree by more efficient tray or packing structures. Some of the approaches to this problem heretofore suggested to the art have been to:

1. Recycle the gas
2. Bleed in outside air
3. Employ gas dampers that block off part of the tower
4. Employ a number of small towers in lieu of a single larger tower.

The recycle and bleed in approaches (1) and (2) consume energy. Power costs increase at low gas flow rates. In addition, dilution of the incoming gas, by recycle or outside air is often detrimental to the gas-liquid contact process. In the instance of the recycle approach the necessary piping and duct connections add significantly to the cost of the gas-liquid contact tower.

The big dampers capable of blocking off part of a large tower (for approach (3) are unwieldy, expensive and unreliable.

Their higher cost is the big objection to employment (for approach (4) of a multiplicity of smaller towers in lieu of a single large tower.

In total, the art still needs a sophisticated low construction cost approach toward improving tower efficiency at high turn down from design capacity flow rates.

It is an object of this invention to provide a gas-liquid contact tower capable of efficient operation at high turn down from design capacity.

Other objects and the advantages of the present invention will be apparent from the description of this invention which follows.

RATIONALE OF THE INVENTION

The underlying concept of the present invention is to partition the tower off in a fashion which prevents gas and/or liquid flow through selected tower portions under high turndown. Then, the gas and liquid flow rates through the tower portions open for flow are that much closer to design capacity, and the high efficiency of design capacity operation can be obtained. In effect, the gas flow path through the tower is made smaller to match low gas flow conditions.

According to practice of this invention vertical partitions are built into the tower internals, dividing the tower, e.g., into portions with separated (parallel) liquid and gas flow paths through the tower. During normal or near design capacity operation of the tower both liquid and gas flow through all tower sections. Under high turn down conditions at least one portion of the tower is blocked off to force all the gas flow through the still open portion or portions.

The tower internals include structures that can create a (liquid) hydrostatic head barrier to gas flow, the barrier serving as the means for selectively blanking off or blocking one or more tower sections to gas flow therethrough. The barrier is created by providing alternative liquid take off levels inside the tower, for example by multiple alternative liquid drain lines from a particular tray. The level of liquid on that tray (usually the bottom tray in the scrubbing section of) the tower can be made to depend on the drain line in use, in effect selectively raising or lowering the liquid level by closing a valve in an outlet water line. The level of liquid can be high enough to prevent gas flow through the tray (into one portion of the tower). One or more tower portions can be taken out of service by presence of such hydrostatic barriers.

Utilization of liquid level for control of gas flow interrelates well with the structural features of tray type gas-liquid contact towers, because each tray is already designed to have a pool of liquid thereon of a pre-determined depth. Normally the tray structure provides for liquid leaving the tray to flow over a weir, with the weir height determining the depth of the liquid pool on the tray. In a commonly used tray structures the gas flows through the pool of liquid by way of perforations in the tray or of bubble caps on the tray.

The vertical partitions inside the tower are, of course, associated with alternative weir levels on the bottom trapout stage so that for high turn down operation the vertical partitions and an adjustment that raises the level of liquid on this particular tray cooperate to block gas flow to one or more portions of the tower; at capacity operation the vertical partitions do not affect gas flow.

The liquid flow rate through the tower is independent of adjustable overflow arrangement on the bottom trapout tray and can be allowed to remain constant (with no change as gas flow varies). However, particularly where the gas-liquid contact towers are part of some chemical process system and gas-liquid equilibria should not change, the liquid feed arrangement and overflow weir system may be associated with liquid feed structure so that liquid flow rates can be reduced in reasonable proportion when the gas flow rates drop sufficiently to justify blocking off one or more tower portions.

DETAILED PRACTICE OF THE INVENTION

Briefly stated the present invention involves a tower vertically partitioned so that gas flows upwardly therethrough in at least two parallel flow paths. At least one tray is provided inside the tower (which tower could otherwise be a packed tower) and this tray is constructed with alternative liquid overflow structures disposed at different elevations so that use of one overflow level allows gas flow through all gas paths in the tower, but use of an alternative higher overflow level creates a depth of liquid on the tray that blocks gas flow to one or more (but not all gas paths). Since typical and known to the gas-liquid contact art towers might have acceptable efficiency at a 2:1 capacity range, vertical partitioning into four compartments or portions together with alternative drain levels that act to channel gas flow into one, two, three or all four compartments will permit operation of the tower over an 8:1 gas flow range with maintenance of the basic performance characteristics of the tower.

Desirably the alternative drain level system is built into the bottom of the gas-liquid contact structures and each drain level is associated with an individual valved outlet conduit. Then the tower can be shifted into a low turn down operation level by turning on or off a valve in an appropriate liquid outlet line.

For further understanding of the invention reference is now made to the attached drawing and description which follows of a preferred scrubber tower embodiment of the invention.

Figure 1:
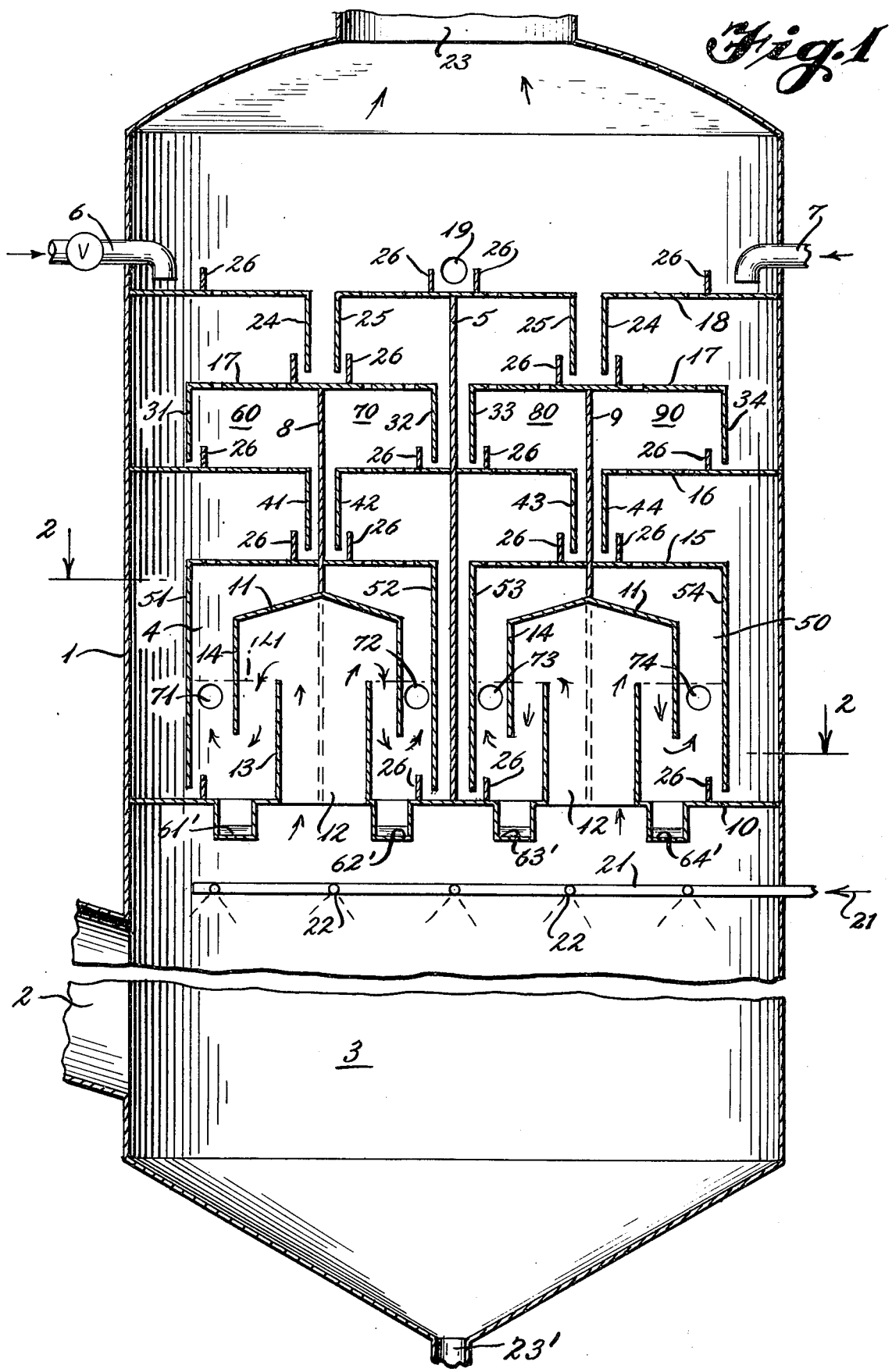
FIG. 1 is a side section through the scrubber tower.
Figure 2:
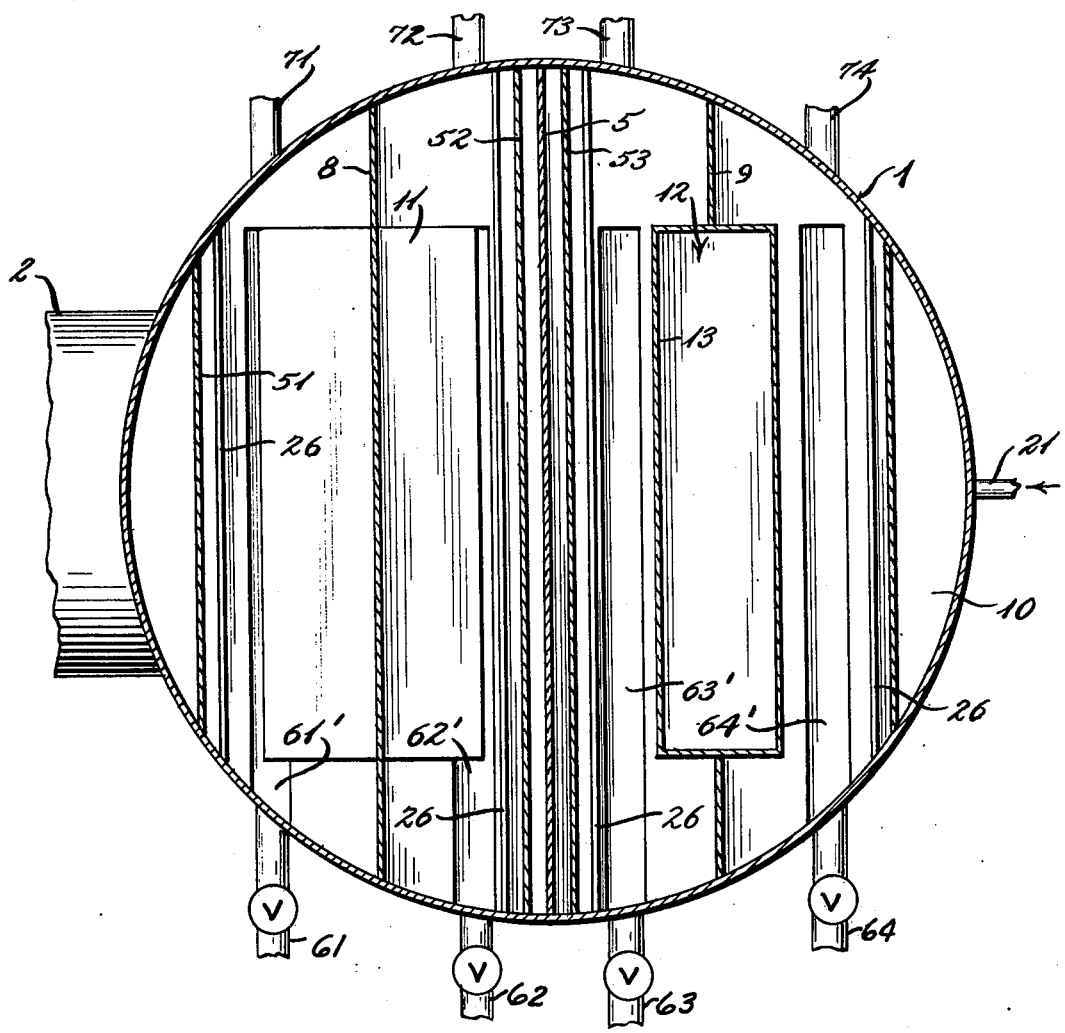
FIG. 2 is a plan section of the tower taken along line 2-2 of FIG. 1.

The drawing illustrates a multi-pass i.e. 4-stage tray scrubber of the target or impingement tray type adapted to remove solid particles from exhaust gases e.g., dryer gases, or furnace gases, divided into two vertical compartments or portions.

In the drawing, reference being made to FIG. 1, numeral 1, is the scrubbing tower into which dirty gases, e.g., flue gas, smelter gases, etc., are led via inlet duct 2 at the lower section 3. Spaced above the lower section of the tower is located the upper or tray section 4.

Scrubbing liquid is sprayed into the lower section 3 of the tower via line 21 and spray nozzles 22. At the bottom of section 3 is a drain 23' which serves to remove pollutant-laden liquid effluent from lower tower section 3. Above lower section 3 is tray scrubbing section 4, a four stage tray section being illustrated. Scrubbing liquid is introduced from above the tray section from inlet lines 6, 7 and 19. As shown in FIG. 1, a vertical partition 5 divides the tray section medially into two tower halves. Vertical partitions 8 and 9 divide each tower half into two vertical compartments or portions for a total of 4 vertically extending tower portions 60, 70, 80, 90. The trays in all portions are the same e.g. target trays, seive trays, valve trays etc., and alone form no part of this invention.

The lowest most tray 50 in tray section 4 acts as a scrubber tray and as a trap-out stage whose purpose is to remove liquid effluent and also as the control means for blocking out selectively one or more of tower portions 60, 70, 80, 90.

The gas-liquid contact structure of tray 50 is generally well-known to the art, consisting of a plate 10 apertured by a multiplicity of chimneys or risers 12 through which the gases pass from lower tower section 3 into the tray scrubbing section 4 and a cap 11 superposed over each chimney or riser 12. The gases rising between chimney walls 13 are channelled down between the sides 14 of cap 11 and the chimney walls 13, then again up once outside of cap 11.

From tray 50 the gases pass up sequentially through each of the four trays 15, 16, 17, 18 shown in the drawing, then out of tower 1 by way of gas outlet main 23 in counter flow with the liquid cascading from tray to tray. The scrubbing liquor which flows counter to the gases flows from top most tray 18 through downcomers 24, 25 past overflow weirs 26 on to tray 17. From tray 17 liquid flows through downcomers 31, 32, 33, 34 on to tray 16. From tray 16 liquid flows through downcomers 41, 42, 43, 44 on to tray 15. From tray 15 liquid flows through downcomers 51, 52, 53, 54 on to the trap out stage or tray 10, from which the liquid effluent is withdrawn through (valved) outlet drain lines 61, 62, 63, 64 when tower 1 is operating at or near design capacity.

In the tower embodiment illustrated by the drawing baffle 5 divides the tower into two portions. Baffles 8, 9 further divide tower 1 into the four portions or compartments 60, 70, 80, 90 each of which has its own scrubber liquor flow path.

In compartment 60 scrubber liquid flows through downcomers 24, 31, 41, 51, then into gutter or inclined channel 61' and out through valved drain line 61. In compartment 70 scrubber liquid flows through downcomers 25, 32, 42 and 52, then into gutter 62' and out through valved drain line 62. In compartment 80 scrubber liquid flows through downcomers 24, 33, 43, 53, then into gutter 63' and out through valved drain line 63. In compartment 90 scrubber liquid flows through downcomers 24, 34, 44, 54, then into gutter 64' and out through valved drain line 64.

In the normal near capacity operation of tower 1, gas containing gaseous or solid pollutants, or both, enters tower 1 via duct 2 into the lower section 3 where it contacts scrubbing liquid sparayed through nozzles 22. The pollutant laden liquid is removed through drain 23' and the gases pass into the tray section 4 equally into each compartment 60, 70, 80, 90 wherein gases pass through the trays counter-current to the scrubbing liquid introduced through inlets 6, 7, 19. The scrubbing liquid effluent laden with impurities, is removed via gutters 61', 62', 63', 64' and drains. The removed scrubber liquids may be cooled, as necessary, then a portion bled off to remove impurities, and thereafter recycled to tower 1.

In a four pass tower, such as is illustrated in the drawing the gas pressure drop from inlet duct 2 to outlet main 23 would be about 11 inches (of water), i.e. about 2 1/2' per tray at trays 15, 16, 17, 18 and about 1' in the trap out stage tray at plate 10. Accordingly 11 inches of water in a hydraulic seal (and even less) would block out any tower portion so sealed, and appropriately, the drawing illustrates an out-sized trap out tray structure built to provide for hydraulic sealing capable of blocking out entire tower portions. Chimneys 12 extend above plate 10 high enough to allow for a substantial depth of liquid on plate 10. The sides 14 of caps 11 extend down far enough to create a hydraulic seal between chimney walls 13 and sides 14 should the liquid level rise to $L_1$.

The hydraulic seal provided according to practice of this invention is created by providing an alternatively used set of trap out stage drain lines 71, 72, 73, 74 disposed at an elevation on tower 1 well above valved drain lines 61, 62, 63, 64. If the valve on trap out drain 61 is closed, the level of scrubber liquor effluent on plate 10 in tray compartment 60 must, perforce, rise until the level L-1 of drain line 71 is reached, at which level the effluent flows out through drain line 71. The depth of liquid (L-1) now in the trap out stage unique to compartment 60 effectively seals compartment 60 off from flow of gas therethrough.

Since each valved drain line 61, 62, 63, 64, is independent, any one or more than one compartment 60, 70, 80, 90 may be blocked off selectively from outside of tower 1 by closing the appropriate drain line valve or valves, and such is done for tower operation at high turn down. In the illustrated embodiment of scrubber tower efficient tower operation can be expected at a 2:1 turn down ratio. By closing drain lines 62, 63, 64 forcing the effluent scrubbing liquid to leave trap out tray 10 by way of drain lines 61, 72, 73, 74. The tower compartments 70, 80, 90 are sealed off from gas flow therethrough, forcing all the gas to flow through compartment 60, efficient tower operation at an 8:1 turn down ratio can be obtained.

Since water conservation is normally not critical to the costs of tower operation (and the water is frequently recycled), the scrubber liquor flow through compartments 60, 70, 80, 90 can be left unchanged regardless of turn down. However, in the event the liquid to gas ratio should be important to best operation of the tower or to save on water costs valving in feed lines 6, 7, 19 (e.g. gate valves with small hole therein) may lower liquid flow into compartment 60, 70, 80 or 90 selectively to a trickle.

For such event baffles 8 and 9 should extend above the level of overflow weirs 26 on tray 18 (splitting downcomers 24, 25).

While the tower 10 has been described as divided into four sections by a single vertical divider, by providing more or less additional vertical dividers, any desired number of compartments will be formed.

The division of the tower into separate vertical scrubber portions or compartments as described above permits great flexibility in gas flow rates while maintaining high operating efficiency, even at low gas-flow rates. For example, high performance at gas throughputs ranging from 204,000 acfm to as low as 70,000 acfm is possible through practice of this invention.

The hydrostatic head sealing system of the present invention offers readily apparent advantages over the expedients heretofore suggested to the art for achieving the same purposes. For example expenditure of additional energy for recycling gas under low turn down conditions is avoided. The capital expense extra gas ducting for bleeding outside air into the tower is avoided. The costs of baffling, of an out-sized trap out stage and of extra drain lines are nominal compared to the benefits.

As a practical matter, the overall improvement in the efficiency of tower operation attainable by practice of this invention may well be more than is readily apparent from the foregoing description. Practice of this invention largely frees the designer of a gas-liquid contact tower from concern about the consequences high turn down will have upon tower operation, and, therefore, the designer can specify high efficiency gas-liquid contact tower elements that would operate poorly under high turn down conditions, and then compensate for anticipated turn down levels by specifying whatever vertical partitioning in the lower (into 2, 4, 6, etc. flow paths) is most appropriate to maintaining efficient tower operation under the worst turn down conditions expected.

The foregoing description of a preferred embodiment of this invention illustrates one means arrangement for selectively creating a hydrostatic barrier (to gas flow into a section of the tower) through raising or lowering a liquid level inside the tower. Many other means arrangements can create the desired hydrostatic barrier. For example, an arrangement easier to describe than to build into a tower is a weir overflow element in one scrubber portion capable of being raised and lowered. Another arrangement is to provide a split level bottom tray (each with the same weir height), and a separate valved drain line for each level. Closing off the drain line from the lowest tray level will make the liquid thereon rise to the level of the next higher drain line creating the desired seal at the lowest tray level.

What is claimed is:

1. A gas liquid contact apparatus adapted for efficient operation at high turn down comprising:
    a vertical tower through which scrubbing liquid flows downwardly therethrough from at least one inlet thereto and gas flows upwardly therethrough from an inlet thereto to an outlet therefrom in counter flow gas-liquid contact.
    at least one vertical baffle within said tower dividing the tower into compartments constituting separated gas-liquid contact flow paths through the tower; and
    means for blocking gas flow through at least one compartment hereinafter termed the first compartment without impeding flow through another compartment, such means including a trap out tray at the bottom of the first compartment from which the liquid effluent is removed and a pair of drains in flow communication with said trap out tray, said drains being disposed at different elevations and means to close off the lower elevation drain forcing thereby a rise in the level of liquid effluent on said trap out tray to the level of the higher elevation drain, the rise in liquid level creating a hydrostatic head barrier to gas flow into the first compartment.

2. The apparatus of claim 1 wherein the tower further comprises baffle means which divide the tower into four vertical compartments.

3. The apparatus of claim 1 wherein each compartment has a trap out tray in the lower portion thereof having two alternative fixed liquid drains therefrom at different elevations on the trap out tray, an individual drain line for each drain extending out from the tower, the lower elevation drain lines each having thereon a valve, whereby a hydrostatic head barrier on any compartment may be created by valving out the lower elevation drain line associated therewith.

4. The apparatus of claim 1 including therein a series of horizontally disposed vertically spaced apart liquid-gas contact trays within each compartment of the tower with the scrubbing liquid cascading down from tray to tray and the gas passing up through each try and wherein the lowest tray of each compartment is said trap out tray.

5. The gas-liquid contact apparatus of claim 1 wherein the said first compartment has an individual scrubbing liquid feed thereto, and means for reducing the liquid feed rate to the said first compartment without also reducing the liquid feed rate to another compartment.

* * * * *